July 22, 1958     J. D. ELLIOTT ET AL     2,844,314
TOTALIZING APPARATUS

Filed Sept. 23, 1954                4 Sheets-Sheet 1

INVENTORS
JAMES D. ELLIOT
EDGAR J. JORDAN
TIMOTHY C. PEGNIM
BY J. BRADLEY COHN
ATTORNEY

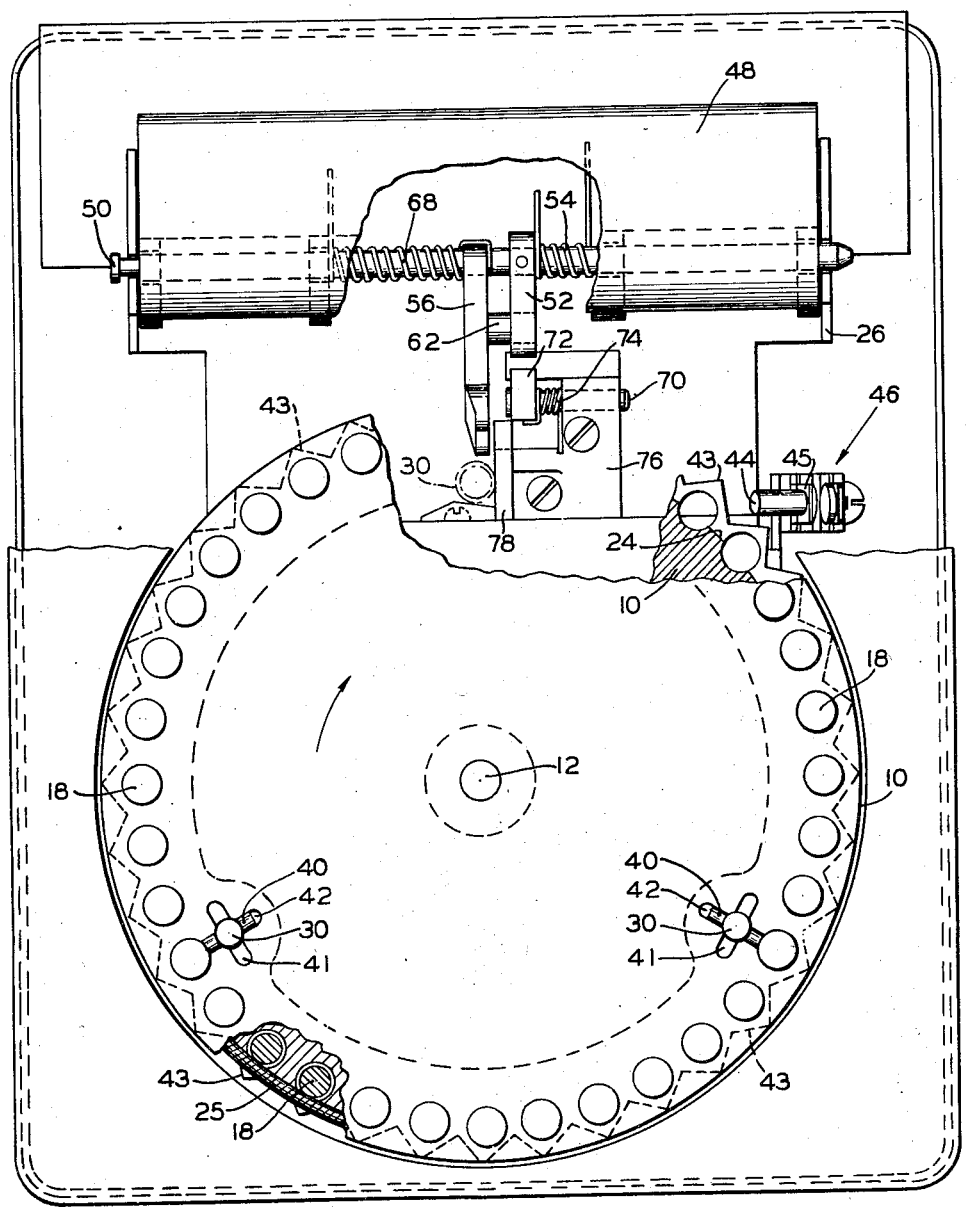

July 22, 1958  J. D. ELLIOTT ET AL  2,844,314
TOTALIZING APPARATUS
Filed Sept. 23, 1954  4 Sheets-Sheet 3
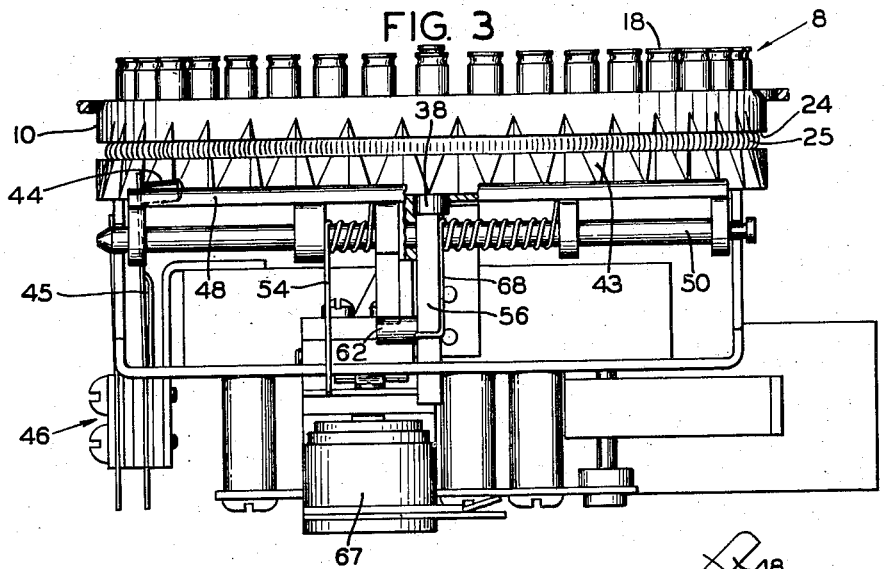
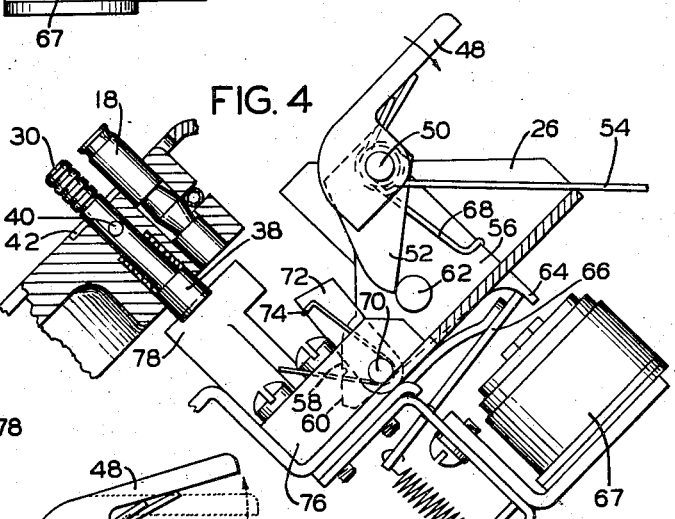
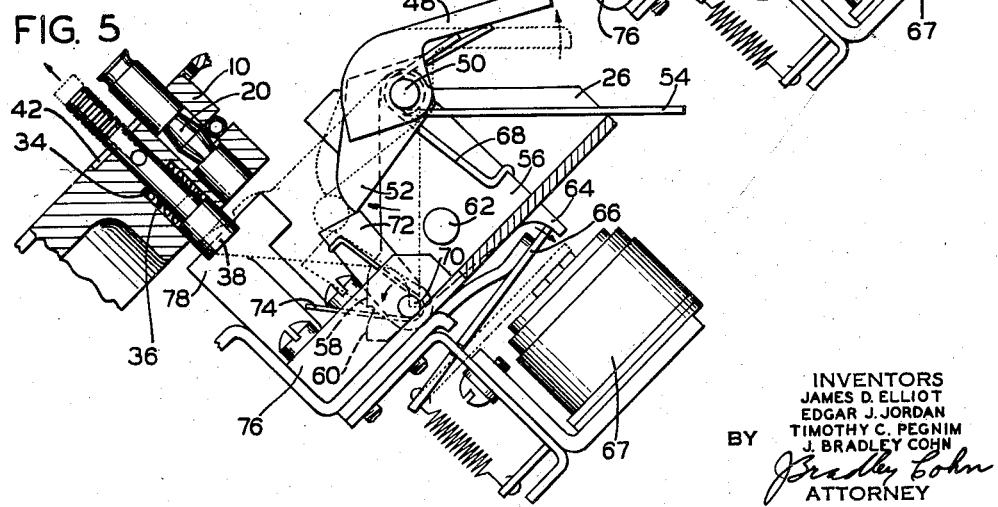
INVENTORS
JAMES D. ELLIOT
EDGAR J. JORDAN
TIMOTHY C. PEGNIM
J. BRADLEY COHN
BY
ATTORNEY July 22, 1958  J. D. ELLIOTT ET AL  2,844,314
TOTALIZING APPARATUS Filed Sept. 23, 1954  4 Sheets-Sheet 4

INVENTORS
JAMES D. ELLIOT
EDGAR J. JORDAN
TIMOTHY C. PEGNIM
J. BRADLEY COHN
BY
*Bradley Cohn*
ATTORNEY 
United States Patent Office 2,844,314
Patented July 22, 1958

2,844,314
TOTALIZING APPARATUS

James D. Elliott, Rosedale, N. Y., Edgar J. Jordan, West Englewood, N. J., and Timothy C. Pegnim, Merrick, and J. Bradley Cohn, New York, N. Y., assignors to American Machine & Foundry Company, a corporation of New Jersey Application September 23, 1954, Serial No. 457,808

14 Claims. (Cl. 235—92)

This invention relates to totalizing devices and particularly to totalizing eggs.

It is an object of the invention to devise a mechanism for storing total and partial counts for subsequent transmission to a central totalizer.

In the egg industry, eggs are graded according to size and/or weight and then packaged in cartons of one, two or three dozen size. The eggs are customarily provided ungraded by farmers. Accurate count of the eggs in each grade from each farmer's lot must be obtained.

It is therefore a further object of this invention to provide a device which will totalize the eggs in a given grade as they are boxed and will at the end of a batch provide a partial count for the remaining eggs that do not fill a specified carton.

It is a further object of this invention to devise a device which will hold or store the count and then subsequently transmit to a central counter.

It is still another object of the invention to provide an apparatus and means by which several transmitting devices may be connected to a single central counter and transmit their information at automatically predetermined specified times to prevent interference between one transmitter and another.

The novel features which are believed to be characteristic of the invention are set forth with particularity in the appended claims. The invention itself, however, both as to its organization and method of operation may be understood by reference to the apparatus embodying the invention and shown in the accompanying drawings in which:

Fig. 2 shows a plan view with parts cut away of the transmitter taken on line 2—2 of Fig. 1;

Fig. 3 is also a plan view of the transmitting device with its housing removed as seen from line 3—3 of Fig. 1;

Figs. 4 and 5 are partial sectional side elevations of the transmitter control mechanisms illustrating the successive operating steps of registering and releasing same;

Fig. 4a is a partial sectional side elevation showing an individual counting pin in active position;

Figure 1:
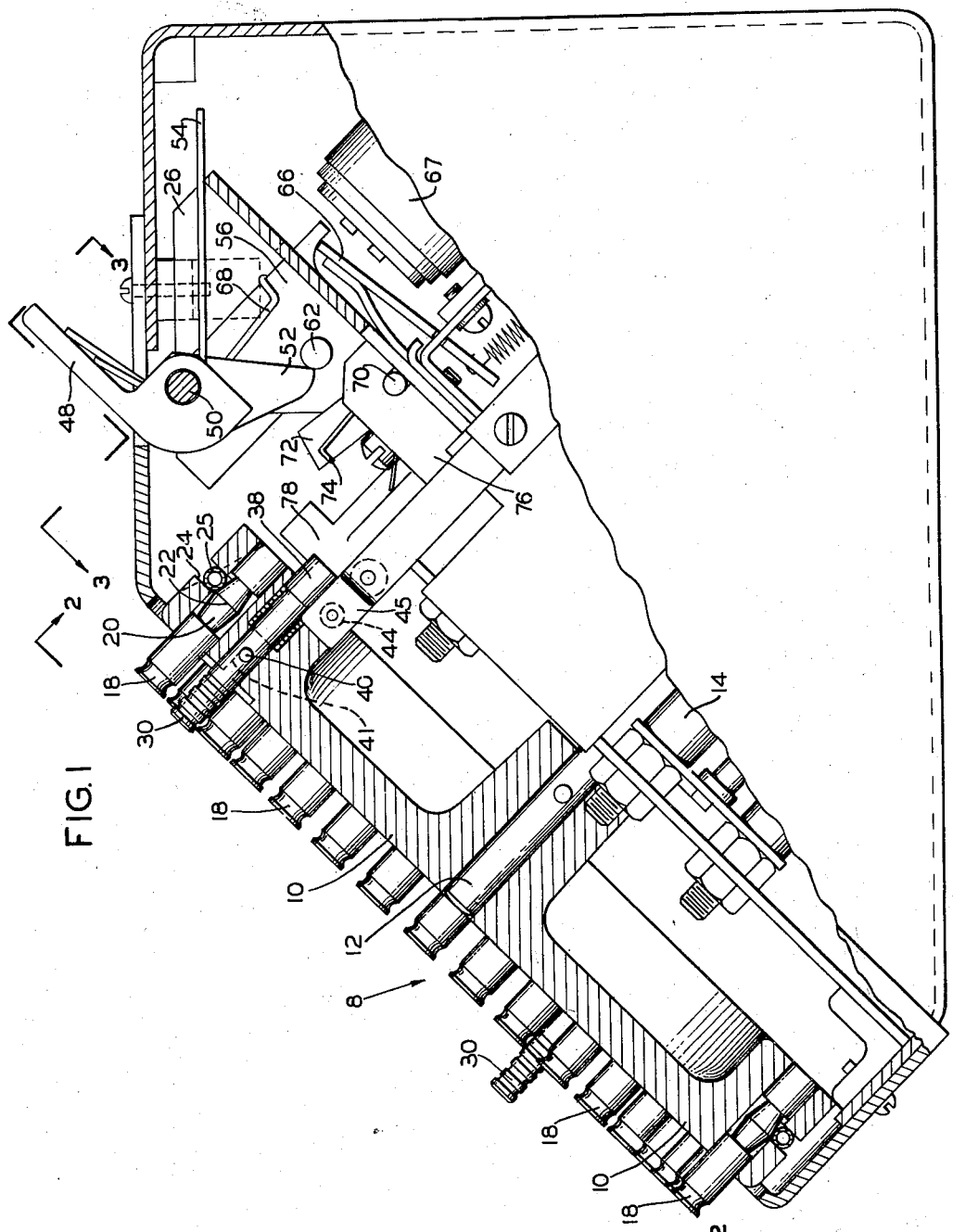
Fig. 1 shows a partial sectional side elevation of one of the novel transmitting devices.

The transmitter 8 consists of a memory wheel 10 mounted on a shaft 12 driven by a constant speed constant torque motor 14. Motor 14 is preferably of the stallable type and is always energized. The memory wheel adjacent its periphery carries a plurality of partial counting pins 18 slidably mounted in suitable bores. The number of pins is determined by the customary number of eggs packed in one container. This is usually one or three dozen and as shown wheel 10 has thirty-six pins 18.

A central portion of the pins 18 is provided with a double cone cam surface 20 having a high spot 22. All pins 18 are held in either up or down position by means of endless coil spring 25 confined in an annual slot 24 formed in the cylindrical outer side wall of wheel 10.

As shown in Fig. 5, pin 18 is in the upward position. If a pin 18 is forced downwardly, the high spot 22 is forced past spring 25 which then bears against the lower part of the upper cone so the lowermost plunger portion 28 of the pin projects below the bottom surface of wheel 10 as shown in Fig. 4a.

Dozen count pins 30 are placed in line, but inwardly, of every twelfth pin 18. Pins 30 are slidably held in bores 32. A spring 36, surrounding pins 30 and confined between the lower plunger portion 38 of the pin and shoulder 34 of bore 32, urges pin 30 downwardly so that plunger portion 38 projects below the bottom surface of wheel 10.

As may be clearly seen in Figs. 4 and 4a, pins 30 have a transverse stud 40 which may be placed in deep slot 41 or shallow slot 42. Slots 41 and 42 are 90° apart and stud 40 may be engaged in either by the operator by lifting and turning pin 30. When stud 40 engages deep slot 41 plunger portion 38 projects below wheel 10 and is in operative position. When engaging shallow slot 42, portion 38 does not project and the pin is in inoperative position.

Figure 6:
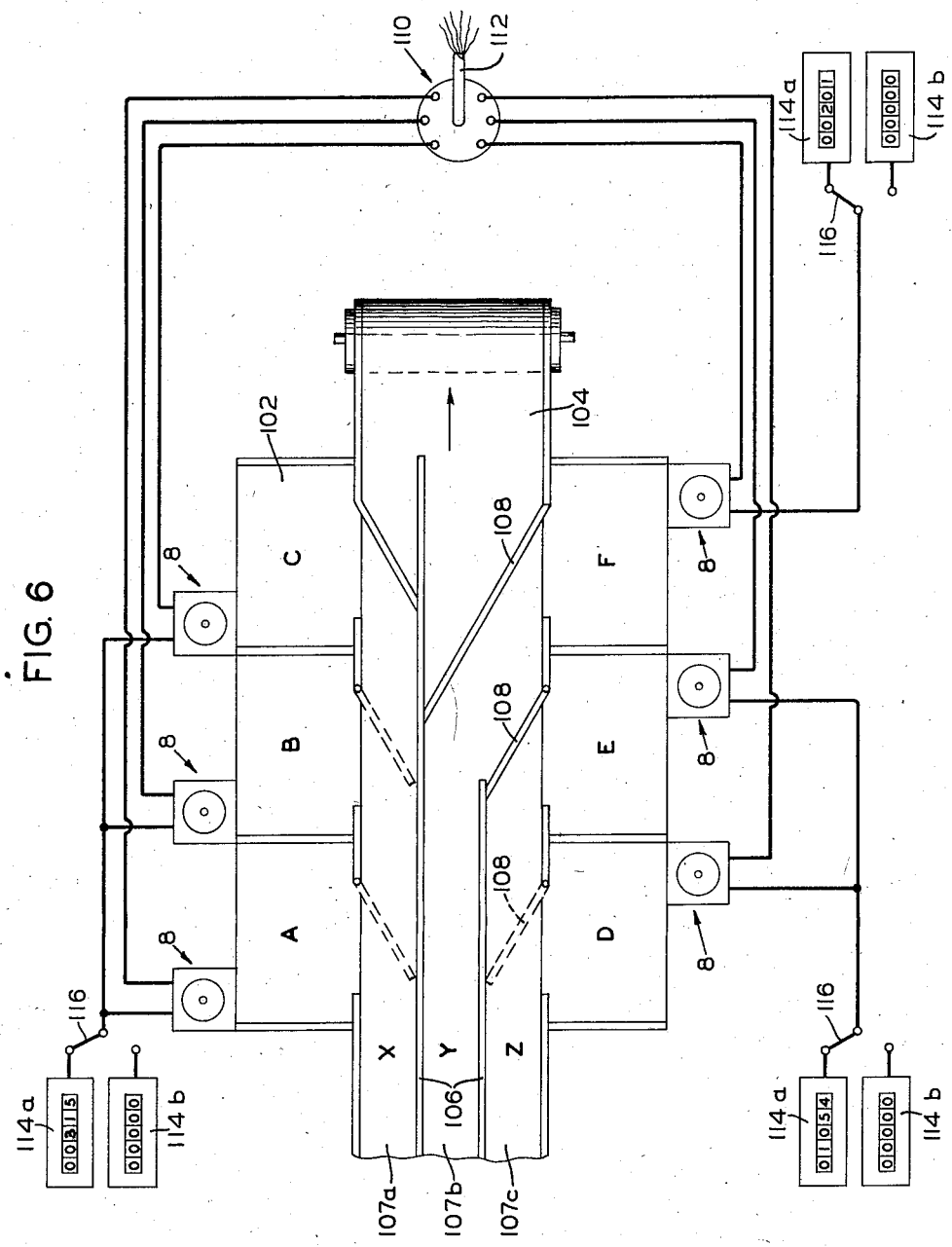
Fig. 6 is a schematic illustration of the transmitter system in conjunction with an impulse distributor, an egg conveyor and counting devices.

The outer bottom rim of memory wheel 10 has thirty-six equally spaced teeth 43 corresponding in number and position to the counting pins 18. During rotation of the wheel, teeth 43 contact a pin 44 mounted on a resilient arm 45 of break and make switch 46 connected by wire 100 to suitable counters 114a, 114b (Fig. 6). These counters are of a conventional type which are actuated to count one for each impulse from break and make switch 46. Thus a complete rotation of wheel 10 as illustrated would close switch 46 thirty-six times and advance a counter thirty-six numbers.

Treadle and actuating mechanism

The transmitter 8 is provided with a hand treadle 48 secured to a shaft 50. Also secured to the shaft 50 is an arm 52. A tension spring 54 surrounding shaft 50 is anchored at its one end against the edge of the supporting bracket 26 and engages at its other end the bottom of treadle 48 urging treadle 48 to upright position.

Also loosely mounted on shaft 50 is a pin actuating member 56 having two striking faces 58 and 60, a boss 62 and a finger 64. Finger 64 of member 56 is urged against a solenoid lever 66 by a tension spring 68 also surrounding shaft 50 and engaging at its one end the top surface of member 56 and at its other end the bottom of treadle 48. Arm 52 normally engages boss 62 due to the action of spring 54.

Loosely mounted on a shaft 70 is a latch 72 which, as shown in Figs. 4 and 5, rests in the loop of a tension spring 74. Shaft 70 is secured in a mount 76 secured to the bracket 26. Also secured to the mount 76 or integral therewith is a stop bracket 78, the free end of which extends towards the bottom surface of memory wheel 10 to engage pins 18 or 30 when projecting from the bottom of wheel 10 as described above.

The operation of the treadle 48 and pin actuating member 56 is as follows:

When the operator pushes down on treadle 48, shaft 50 is rotated against the tension of spring 54 and arm 52 disengages boss 62 and moves past spring tensioned latch 72 to hold treadle 48 in a downward position after release by the operator as shown in Fig. 5. This action stores great tension energy in spring 54, tending to urge member 56 in a clockwise direction.

However, member 56 is prevented from rotating by solenoid lever 66 engaging projection 64. When solenoid 67 is energized, lever 66 is thereby moved out of engagement with projection 64 permitting member 56 to swing clockwise under force of tensioned spring 68 to strike a projected pin 30 or 18. This action of member 56 knocks the pin over the free end of stop bracket 78. Since pin 30 is spring-loaded the plunger portion 38 will return after it has passed stop bracket 78, but a pin 18 will remain in upward position due to spring 25 engaging below high point 22. The wheel 10, of course, is under constant torque from stalled motor 14 and will rotate until the next projecting pin 18 or 30 contacts stop bracket 78.

The striking position of member 56 is shown in dotted lines in Fig. 5. As member 56 moves to this position, boss 62 depresses latch 72 to release arm 52 so that during the return movement of member 56 the mechanism including treadle 48 may resume normal position under the action of spring 54.

With reference to Fig. 6, a continuously moving delivery conveyor 104 has an upper horizontal run provided with guides 106 and suitable deflectors 108 to deliver the graded eggs to the appropriate counting stations, A, B, C, D, E and F, each of which is provided with a transmitter 8 heretofore described. As here illustrated, there is included in the counting system an impulse distributor 110 as well as three pairs of individual counters. The break and make switch 46 of each transmitter is connected in a separate circuit to its respective counter or, as shown, one of a pair of counters by selective throw switch 116. The power supply for this circuit is not shown, but is obvious to one skilled in the art. For purposes of illustration, a counting procedure is as follows:

Six counting stations are arranged so that stations A, B and C receive grade X eggs coming from channel 107a, stations D and E, grade Z eggs coming from channel 107c and station F, grade Y eggs coming from channel 107b.

An operator is located at each station to count and box the eggs in one, two or three dozen containers.

Assuming that the operator at each counting station is packaging the eggs in containers of three dozen capacity, she will inactivate two of the three dozen count pins 30 by engaging the studs 40 of two pins 30 in shallow slots 42 of wheel 10. When she has filled a box with 36 eggs she presses the treadle 48. The same operation may occur about the same time at each other counting station.

In order to provide that the transmitters 8 each send their count in during separate time intervals, the distributor 110 successively distributes power from power supply 112 to each of the solenoids 67 of the respective transmitters 8. As above explained, the transmitters then send in the count (36, if any) stored in them by the operator when she depresses the treadle 48. In this way a plurality of transmitters 8 may be connected to one counter without interfering with each other in transmitting a count. The break and make switch 46 is connected in series at all times to the individual counters 114a or 114b.

In packaging the last box in each grade at the end of an individual farmer's lot, it is quite obvious that the count will rarely come out to an even one, two or three dozen. Accordingly, the operator counts the eggs in the box and pushes the corresponding counting pins 18 (pins 18 may be numbered 1 to 36 or three series of 1 to 12) on memory wheel 10. She then depresses treadle 48 and when distributor 110 fires the transmitter this lesser or partial count goes into the counter 114a since wheel 10 will only rotate until the partial count pin 18 contacts stop bracket 78 to transmit a count corresponding to the depressed pin 18. When the operator then begins on a subsequent farmer's lot and her transmitter is connected through switch arm 116 to counter 114b, she completes the fill of the container and again depresses her treadle 48. The memory wheel is now, of course, stalled on partial count pin 18 and not on pin 30. Therefore, when the distributor fires the transmitter only the remaining count on the wheel 10 between the pin 18 which she has previously depressed and the dozen count pin 30 is transmitted to counter 114b. This number, of course, corresponds to the number of eggs taken from the subequent farmer's lot to completely fill the container partly filled from the first farmer's lot.

Switch arm 116 and counter 114b are provided to permit time to record the totals from the first farmer's lot without delaying proceeding with packaging and counting a succeeding farmer's lot.

For purpose of illustration, I have shown only three grades X, Y and Z on the outfeed conveyor 104. In actual practice, there are usually five or six grades and a correspondingly larger number of counting stations than A through F. In a preferred plan various arrangements and variations of arrangements may be provided for connecting the transmitters to different counters to provide for heavy "traffic" in one or more grades of eggs. That is, it may be desirable to have five stations handling one grade and only one station handling another grade. Such arrangements may be readily provided by one skilled in the art of electric wiring.

When one dozen containers are being filled all three (dozen count) pins 30 are placed in operative position. The procedure is then identical with that described above. The full count (depressing treadle 48 only), however, will only be twelve rather than thirty-six.

Various modifications may be made in the system and wheels 10 of different transmitting number employed still within the spirit of the invention in which we claim:

1. A counter actuator for counting individual eggs of numerical group units and partial counts of less than such units comprising cam means to activate a counter, means to move said cam, stop means to arrest said cam at group unit intervals, said stop means being yieldably movable to an inoperative position, other stop means normally in inoperative positions and selectively movable to operative position to arrest said cam at any selected partial count, and an actuating member operative when energized to move any of said stop means into inoperative position whereby said stop means will automatically return to an operative position and said other stop means will remain in inoperative position.

2. In a totalizer for totalizing eggs in combination with an individual counter, a series of counter actuators, each of said actuators having means for feeding partial group unit count and total group unit count into said counter, said actuators each having means to store information until actuated by an electric impulse, and a distributor connected to said actuators to distribute an electric impulse to each successively in a timed cycle, the time intervals between each impulse being at least sufficient to permit the actuator to transmit its stored information.

3. In a machine for transmitting a count from several groups to a single counter, the combination of a totalizer, a plurality of transmitters operatively connected to said totalizer to activate said totalizers, each of said transmitters being characterized by means for transmitting a specific count and having a memory device to retain said specific count and transmit it upon activation, and a distributor connected to each of said plurality of transmitters to activate each transmitter successively at predetermined spaced periods of time so each transmitter may transmit its specific count during a time interval coinciding with the activation of no other transmitter.

4. In a count transmitter for storing information for transmission at a predetermined selected time, a rotary cam operative to activate a totalizer a specified number of times during rotation and having instrumentalities corresponding to specific numerical quantities, a stop member positioned to engage said instrumentalities to arrest the motion of said cam, said instrumentalities being movable to a stop engaging position and a non-engaging position, positioning means engaging said instrumentalities to maintain them in each of said positions, an actuating member located adjacent said stop and operative to contact any of said instrumentalities engaging said stop to move any one of said instrumentalities from stop engaging position to non-engaging position, motive means operative to impel said actuating member into contact position to engage and move said instrumentalities, and arresting means holding said actuating member against said motive means, said arresting means being independently controlled to release said actuating member so said rotary cam may rotate to transmit a predetermined count.

5. A transmitter for activating a totalizer at a predetermined time for a selected numerical quantity, said transmitter having a wheel, a motor operatively connected with said wheel to constantly drive it, transmitting means on said wheel operative to activate a totalizer a specified number of times for each rotation of said wheel, a stop positioned adjacent said wheel, members corresponding to said selected number movably mounted on said wheel to stop engaging and non-engaging positions to arrest the motion of said wheel when engaging said stop, and means located adjacent said stop operative when activated to move one of said members in contact with said stop into non-engaging position to pass said stop on rotation of said wheel.

6. A transmitter for activating a totalizer at a predetermined time for a selected numerical quantity, said transmitter having a wheel, a motor operatively connected to said wheel to drive it, transmitting means on said wheel operative to activate a totalizer a specified number of times for each rotation of said wheel, means when contacted to stop said wheel and said motor, members corresponding to said selected number movably mounted on said wheel to means contacting and non-contacting positions to arrest the motion of said wheel, and further means located adjacent said first means operative when activated to move one of said members contacting said first means into non-contacting position.

7. The combination of a plurality of devices such as set forth in claim 5 and further characterized by instrumentalities for successively and at predetermined spaced time intervals activating said means.

8. The combination of a plurality of devices such as set forth in claim 6 and further characterized by instrumentalities for successively and at predetermined spaced time intervals activating said further means.

9. A transmitter for activating a totalizer at a predetermined time for a selected numerical quantity, said transmitter having a wheel, a motor operatively connected with said wheel to constantly drive it, transmitting means on said wheel operative to activate a totalizer a specified number of times for each rotation of said wheel, a stop positioned adjacent said wheel, members corresponding to said selected number movably mounted on said wheel to stop engaging and non-engaging positions to arrest the motion of said wheel when engaging said stop, means located adjacent said stop operative when activated to move one of said members in contact with said stop into non-engaging position to pass said stop on rotation of said wheel, and at least one further stop engaging member on said wheel in a position corresponding to at least one of said members of selected number and being movable by said activated means from a stop engaging position to a non-engaging position, said further stop engaging member having yieldable means urging it into stop engaging position so it will automatically return to said stop engaging position when said activated means has moved it into non-engaging position to pass said stop member whereby said further stop engaging member may automatically stop said wheel at least once during each revolution of said wheel.

10. A device for storing information for transmission at a subsequent predetermined time to a totalizer, comprising a wheel mounted for rotation, a motor operatively connected to drive said wheel, instrumentalities on said wheel operative to activate a totalizer a predetermined number of times for each rotation of said wheel, pins slidably mounted in said wheel and corresponding in number to said instrumentalities, a stop member located adjacent said wheel, said pins being slidably movable to stop engaging and non-engaging positions, means to resiliently hold said pins in either of said positions, at least one other pin mounted adjacent one of said first-named pins and likewise movable from a stop engaging to a non-engaging position, said second-named pin having means to yieldably urge it into stop-engaging position, a pivoted lever yieldably held in an initial position, a pivoted actuating member mounted adjacent said stop member and movable to a pin contacting position to move a pin in stop engaging position out of stop engaging position to permit said motor to rotate said wheel, means energized by said pivoted lever when said lever is moved from said initial position, said means when energized being operative to urge said pivoted member against said pin with sufficient force to move it out of stop engaging position, a solenoid operated control contacting and arresting said pivoted member to hold it against said energized means to prevent its engaging said pin, a latch to hold said pivoted lever in said means energizing position, said latch being releasable by said pivoted member as it moves against said pin, a solenoid to operated said solenoid control when energized whereby said pivoted member is permitted to move under the force of said energized means when said lever is activated and held to engage said pin and trip said latch so said pin disengages said stop and said pivoted lever returns to its initial non-energizing position.

11. The combination of a plurality of devices as set forth in claim 10, further characterized by a distributor operatively connected to said solenoids of said devices to activate said devices in succession in a predetermined time sequence.

12. In combination with a plurality of devices having a memory means operative when activated to transmit any of several selected counts, a totalizer to which said devices are operatively connected, and a distributor connected to said devices to activate said devices successively at predetermined time intervals to transmit selected counts to said totalizer during non-coinciding periods of time.

13. In a count transmitter for activating a totalizer a selected number of times, means movable to activate said totalizer a predetermined number of times for a given degree of movement, a stationary instrumentality adapted when contacted to arrest the movement of said movable means, a member on said means movable from an instrumentality contacting to an instrumentality non-contacting position, and an actuating member located adjacent said instrumentality and operative when energized to contact said member to move it from an instrumentality engaging position to a non-engaging position.

14. In a count transmitter for activating a totalizer, rotating wheel, means on said wheel to activate said totalizer a specified number of times during rotation of said wheel, a device positioned adjacent said wheel and operative when contacted to arrest the rotating motion of said wheel, a device contacting instrumentality on said wheel movable into a contacting position and a non-contacting position, and an actuating member located adjacent said instrumentality and operative when energized to move the device contacting instrumentality from a contacting position to a non-contacting position to permit said wheel to rotate and the means to activate the totalizer.

References Cited in the file of this patent

UNITED STATES PATENTS

| | | |
|---|---|---|
| 2,523,516 | Potter | Sept. 26, 1950 |
| 2,540,751 | Numma | Feb. 6, 1951 |
| 2,555,405 | Funk | June 5, 1951 |
| 2,558,218 | Julius | June 26, 1951 |
| 2,668,012 | Lindeman | Feb. 2, 1954 |
| 2,697,550 | Sneed et al. | Dec. 21, 1954 |